UNITED STATES PATENT OFFICE.

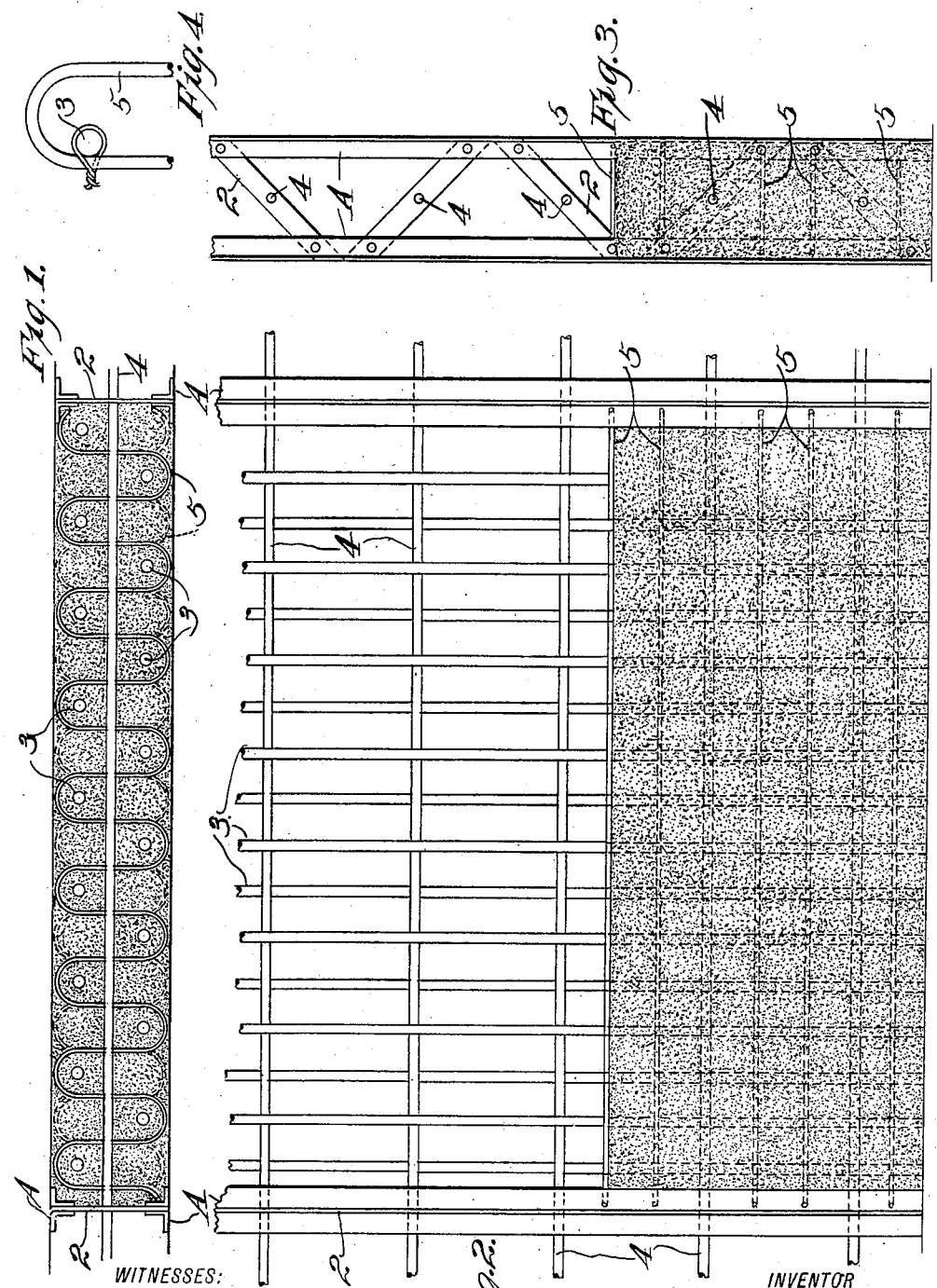

JOHN T. COCHRAN, OF OAKLAND, CALIFORNIA.

REINFORCED CONCRETE BUILDING CONSTRUCTION.

No. 861,502.  Specification of Letters Patent.  Patented July 30, 1907.

Application filed June 28, 1906. Serial No. 323,771.

*To all whom it may concern:*

Be it known that I, JOHN T. COCHRAN, a citizen of the United States, residing at Oakland, in the county of Alameda and State of California, have invented new and useful Improvements in Reinforced Concrete Building Construction, of which the following is a specification.

My invention relates to improvements in building construction.

It consists in a combination in concrete or equivalent material, and metal frames or studding, of transversely and vertically disposed bars, and also a series of sinuous rods or bars interwoven transversely and tied to the vertical rods; all of said structure being embedded in the concrete during its building and forming a bond therefor.

It also comprises details of construction which will be more fully explained by reference to the accompanying drawings, in which—

Figure 1 is a plan view, and Fig. 2 is a side elevation of the improved wall. Fig. 3 is an end view thereof. Fig. 4 is a detail showing members tied.

My invention is especially designed for the construction of walls of buildings, and has for its object to make said walls stronger and especially proof against the action of earthquakes. I have herein illustrated a sufficient portion of such a wall as to explain my invention.

A A represents the outer and inner angle iron, vertical studs or beams which are separated at a distance substantially equal to the thickness of the proposed wall. These studs are placed at sufficient intervals in the direction of the length of the wall, and the pairs of studs are united by transverse bars 2, thus leaving openings centrally between the outer and inner studs or beams A A. Upon the outside of these angle iron beams is formed a mold or form of suitable material and construction. Vertical rods 3 are set up within the line of the proposed wall. I have here shown these rods as set up in parallel rows at points intermediate between the outside and the center of the wall. These rods extend to the top of the proposed structure, and may if desired, be secured at each end to top and bottom timbers or parts of the structure. Intermediate between these vertical rods are fixed horizontal rods 4. I have here shown such rods extending between the transverse bars 2 of the metal structure to which they may be secured, extending through as many of said bars as may be found desirable. The form and vertical rods being in place, the concrete or other cement is filled into the form embedding the vertical rods and making a solid structure. If the horizontal rods are also in place, they will be embedded as the work proceeds, but it will be understood that these rods may be placed successively after the level of the concrete wall has been brought up to about the level of the position that the rods are to occupy. The rods may then be inserted and the filling carried on until they are embedded. In order to further tie and strengthen the structure, I have shown a series of small rods or wires 5 which are woven in and out between the vertical rods 3, and preferably at points intermediate between the horizontal and longitudinal rods 4. These sinuously disposed rods or wires may also be tied at intervals to the vertical rods, if found desirable. These wires are laid in and fixed in place when the body of concrete has been brought up to the level at which these rods are to be fixed, and being properly bent they are laid upon the concrete and fixed in position as previously described; after which the concrete is filled in over, around and above, until these ties are embedded within the concrete. The outer ends of the curves of these ties are sufficiently within the outer faces of the proposed wall, so that they will be entirely embedded and only a smooth concrete surface will be exposed. I thus build my wall to any desired height, and when complete and set, it provides a very strong and durable structure.

Having thus described my invention, what I claim and desire to secure by Letters Patent, is—

1. A frame-work consisting of vertical beams or studding, rods extending horizontally between said beams and substantially central between the two sides of the wall, vertical rods extending from the base upwardly in parallel rows, said rods being disposed in staggered relation upon each side of the horizontal rods, sinuous and horizontally disposed rods extending between the vertical and horizontal rods, and a body of concrete molded within and around the studding and within which the tie-rods are embedded.

2. In building construction, a metal-framework consisting of vertically disposed angle iron beams forming the outer and inner boundary of the wall thickness, transverse bars by which said beams are united to form studding and having openings between, rods fixed vertically within the line of said studding, other rods extending horizontally through the tie-plates of the studding, said vertical rods being disposed in staggered relation upon each side of said horizontal rods, horizontal rods bent into sinuous form and disposed between the vertical and horizontal rods, and a filling of concrete surrounding and inclosing the rods, and continuous through the openings of the studding.

In testimony whereof I have hereunto set my hand in presence of two subscribing witnesses.

JOHN T. COCHRAN.

Witnesses:
C. C. HAMILTON,
C. S. LONG.